United States Patent [19]

Nakagawa

[11] 4,266,738
[45] May 12, 1981

[54] TAPE REEL
[75] Inventor: Akira Nakagawa, Tokyo, Japan
[73] Assignee: Nifco Inc., Yokohama, Japan
[21] Appl. No.: 94,006
[22] Filed: Nov. 14, 1979
[30] Foreign Application Priority Data Nov. 22, 1978 [JP] Japan ............................ 53/159951[U]

[51] Int. Cl.³ .............................................. B65H 75/28
[52] U.S. Cl. .................................... 242/74.1; 242/71.8
[58] Field of Search ....................... 242/74.1, 74.2, 74, 242/71.8

[56] References Cited

U.S. PATENT DOCUMENTS

| 1,578,231 | 3/1926 | Deses et al. | 242/74.1 |
| 2,943,808 | 7/1960 | Loewe et al. | 242/74.1 |
| 3,233,842 | 2/1966 | Grafton | 242/74.2 |
| 3,497,050 | 2/1970 | Landgraf | 242/74 X |
| 3,861,614 | 1/1975 | Horak | 242/71.8 |

Primary Examiner—John M. Jillions
Attorney, Agent, or Firm—Thomas W. Buckman; Jack R. Halvorsen

[57] ABSTRACT

An improvement in and concerning a tape reel of the rotational assemblage type wherein one of the two flanges of the tape reel is integrally joined to one end of the hub and the other flange is molded separately in such a construction that the reel assemblage is accomplished by applying the separately molded flange to and rotating it relative to the other end of the hub, which improvement comprises means capable of permitting fast retention of the inner end of a tape to be accomplished simultaneously with the work of reel assemblage by the rotation of the separately molded flange.

4 Claims, 6 Drawing Figures

Fig_1

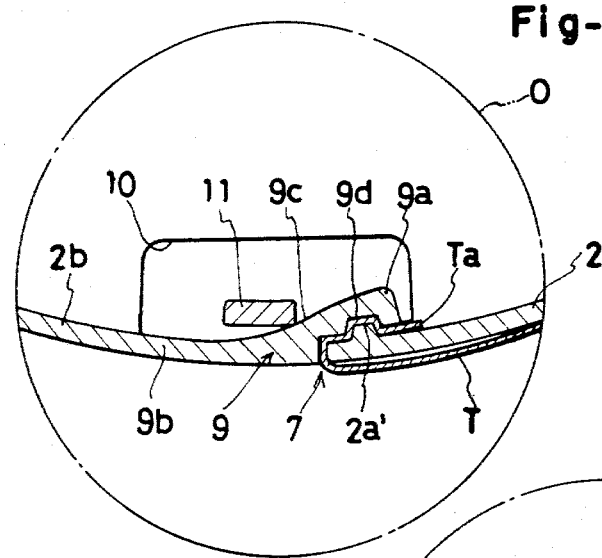
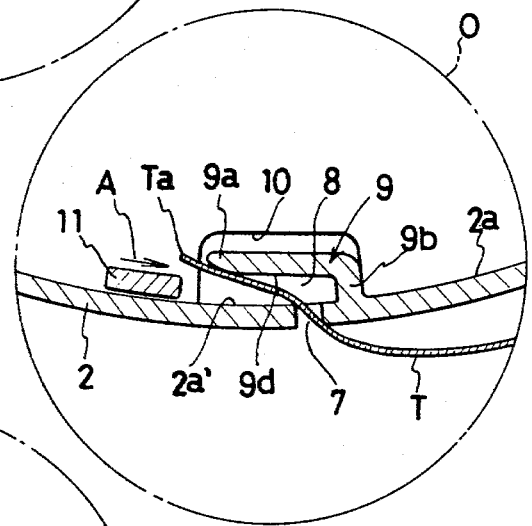
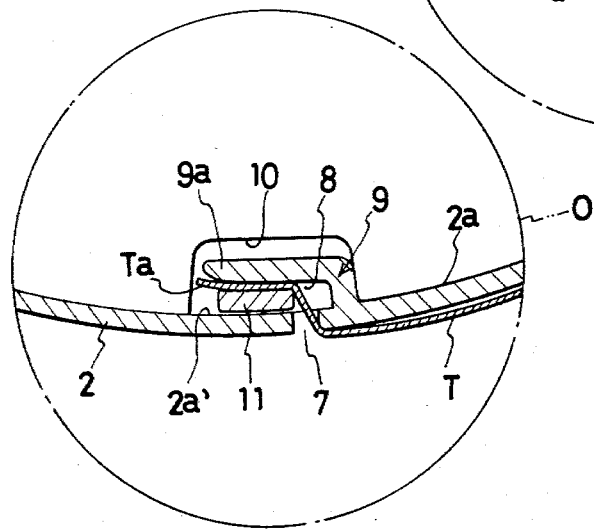

TAPE REEL

BACKGROUND OF THE INVENTION

This invention relates to a tape reel for winding a video tape or an ordinary audio tape, which tape reel is constructed so that the reel is capable of automatically catching firm hold of the inner end of the tape at the time the reel is assembled.

Recently, an increasing proportion of audio and video tape reels have come to be manufactured of plastic materials on account of the ease of molding and the convenience of assemblage. With the exception of ordinary audio cassette tape reels and other similar tape reels, almost all tape reels are provided on the opposite axial end surfaces of the central hubs with flanges having a greater diameter than the aforementioned hubs and it is most convenient to make such reels of plastic materials which by nature enable the tape reels to be easily assembled by the ultrasonic-wave welding technique or the mechanical snap setting technique. If they are made of metallic materials, they require time and labor because their hubs and flanges must be fastened to their reels proper such as with screws.

One example of a tape reel which is specifically designed for the purpose of ensuring simplicity of assemblage has a construction such that one of the two flanges and the hub are either molded integrally or joined in advance and subsequently the remaining separate flange is united with the hub by being applied to and rotated into the opened end of the hub. Structurally, the hub is internally provided with either a step portion formed on the inner wall surface of the hub throughout the entire circumference or cross-piece step portions extending radially from the inner wall to the central portion of the hub and the separate flange is provided with catches formed respectively in externally radial directions or in a circumferential direction, whereby the union of the hub and the flange is attained by rotating the flange relative to the hub to have the catches brought into tight engagement with the step portions (U.S. Patent Application Ser. No. 65,810, filing date Aug. 13, 1979, now U.S. Pat. No. 4,234,137).

As concerns assemblage, such convenient methods as described above have been proposed to the art and improvements such as providing step portions in two levels or designing catches in an unreversible construction have been suggested for the purpose of precluding possible breakage of union due to backward rotation. For the tape reels of this kind, one more important requirement which must not be overlooked is the fact that the inner end of the tape being wound on the reel should be immovably retained on the hub of the reel.

This particular requirement is imposed on video cassette tape reels. With the conventional tape reels, the retention of the inner tape end on the hub entails highly troublesome work and the outcome of the work of retention of the tape end on the reel has an effect upon the accuracy with which the tape is wound on the reel.

From the structural point of view, the device commonly used in the aforementioned conventional tape reel for the fast retention of the inner tape end comprises a dent formed in a radial direction at one portion of the external circumference of the cylindrical hub and a wedge formed in a shape matching the dent, whereby the retention is obtained by overlaying the dent with the inner tape end and subsequently pressing the wedge into tight engagement with the dent across the tape end (U.S. Appl. Ser. No. 65,819, filing date Aug. 13, 1979). This work requires delicate operations and is made more complex by the fact that the work must be carried out in the very small space left between the two opposed flanges already fastened to the hub. Moreover, since the external circumference of the hub around which the inner tape end is to be wrapped includes as a portion thereof the external surface of the wedge, the hub in its complete form tends to be deprived of circularity. This fact has frequently resulted in loss of reel accuracy and consequent occurrence of the phenomenon of wow flutter during the winding and unwinding of the tape on the reel.

These disadvantages are entailed by not only the tape reels of the type described above but also the tape reels of other types, and they mostly originate in the fact that the work of the reel assemblage and the work of the retention of the inner tape end to the hub are performed independently of each other.

An object of the present invention is to provide a tape reel so constructed that the fast retention of the inner end of the tape to be wound on the reel can be attained at the same time that the tape reel is assembled.

SUMMARY OF THE INVENTION

To accomplish the object described above according to the present invention, there is provided an improvement in and concerning a tape reel of the rotational assemblage type having at least one of the two flanges for attachment to the opposite axial end surfaces of the reel hub molded separately from the hub in such a construction that the union of the separately molded flange with the hub is accomplished by causing the flange to be applied to and rotated to establish tight engagement between the engaging means provided on the hub and the flange, which improvement comprises a groove formed in a radial direction in the external circumferential edge of the hub to permit insertion therethrough of the inner end of the tape to be wound on the hub, a pair of opposed resilient walls defining a circumferential space enabling the interior of the hub to communicate with the radial groove, and an engaging projection formed on the separately molded flange in a construction such that in consequence of the rotation of the flange relative to the hub, the engaging projection comes into engagement with the resilient walls and eliminates the circumferential space by contact thereof through the medium of the inner tape end.

In the tape reel constructed as described above, the inner end of the tape to be wound on the reel is inserted into the groove formed in the hub and, thereafter, the separately molded flange is brought into contact with the free end surface of the hub and rotated relative to the hub. Consequently, the separately molded flange is united with the hub and, at the same time, the inner end of the tape inserted in the groove is fastened to the hub owing to the close approach of the engaging projection formed on the separately molded flange to the elastic walls formed on the hub. Thus, just one rotation of the separately molded flange simultaneously accomplishes the assemblage of the reel and the fast retention of the tape end to the reel hub.

The other objects and characteristics of the present invention will become apparent from the further disclosure of the invention to be given hereinafter with reference to the accompanying drawing.

BRIEF EXPLANATION OF THE DRAWING

FIG. 4 is an enlarged sectional view of the essential part of the tape reel of FIG. 3, as held in a state having the inner end of the tape retained fast in position in the reel;

FIG. 5 is an enlarged sectional view of the essential part of another embodiment of the tape reel according to the present invention, as held in a state having the inner end of the tape inserted in the reel; and FIG. 6 is an enlarged sectional view of the essential part of the tape reel of FIG. 5, as held in a state having the inner end of the tape retained fast in position in the reel.

DESCRIPTION OF PREFERRED EMBODIMENTS

Figure 1:
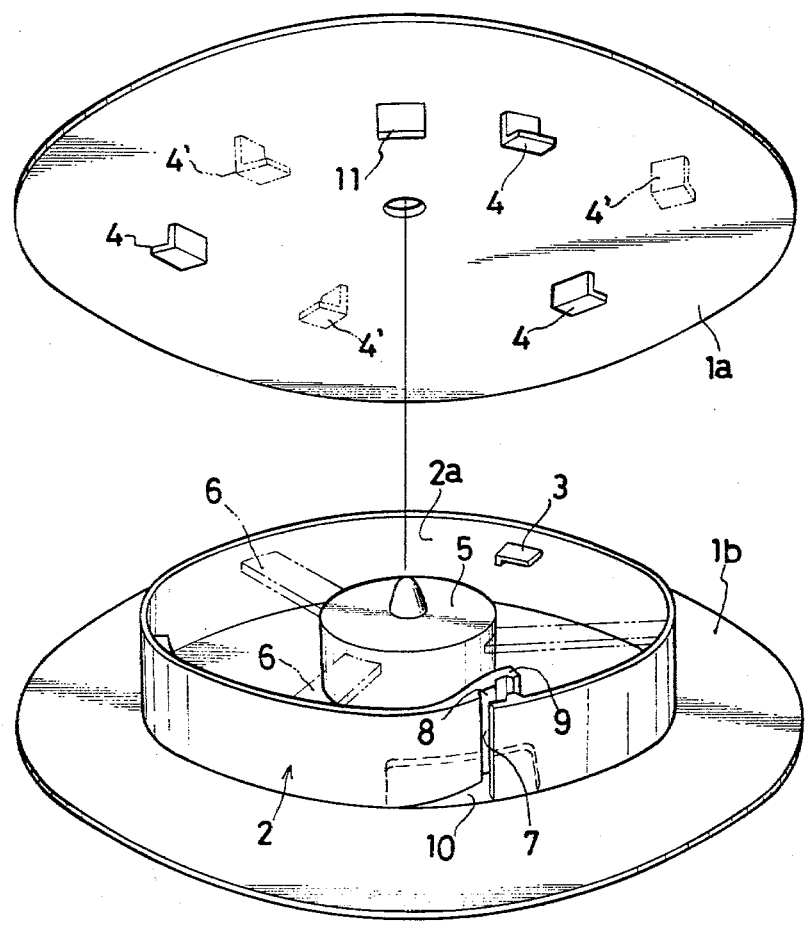
FIG. 1 is a perspective view of one embodiment of the video cassette tape reel according to the present invention, as held in a state prior to assemblage.

FIGS. 1-4 illustrate the first embodiment of the reel for the video cassette tape according to the present invention. This embodiment can be applied to any of the known tape reels of the rotational-assemblage type without reference to their possible structural variations. The rotational assemblage of the tape reel will be described in broad outline with reference to the illustrated embodiment. One reel flange 1b of the pair of reel flanges 1a, 1b is either molded integrally with or attached in advance to one axial end of a hub 2. The hub 2 is provided on the inner wall surface 2a thereof with inwardly radial projections 3 which are disposed at suitable circumferential intervals. The lower surfaces of the projections 3 each serve as a circumferential step portion.

On the other hand, the flange 1a molded separately from the flange 1b is provided on the reverse side thereof at positions corresponding to those falling along the inner wall of the hub with engaging pieces bearing outwardly radial catches 4 and disposed at circumferential intervals roughly equalling those for the aforementioned projections 3. The distance between the upper surfaces of the catches 4 and the reverse surface of the flange 1a is slightly smaller than that between the lower surfaces of the projections 3 and the open edge of the hub.

When the separately molded flange 1a is brought into contact with the open edge surface of the hub to allow the catches 4 to thrust into the hub 2 (as indicated by the solid line in FIG. 2) and the flange is then rotated relative to the hub, the catches 4 and the corresponding projections 3 are brought into mutually pressed engagement owing to the forced contact established between the upper surfaces of the catches 4 (as indicated by the chain lines in FIG. 2) and the lower surfaces of the projections 3. As a result, the work of fastening the flange 1a to the hub 2 is completed.

In this case, the catches 4 are extended in the outwardly radial directions and the projections 3 are extended in the inwardly radial directions, whereby they are brought into mutual engagement in the radial directions after their relative motion in the circumferential direction. The mutual engagement between the flange 1a and the hub 2 may be otherwise obtained in the circumferential direction. For example, cross-piece step portions 6 are extended between the inner wall surface 2a of the hub and the central portion 5 of the hub and the catches 4' to be disposed on the separately molded flange 1a are extended in the circumferential direction as indicated by the chain lines in FIG. 1, whereby the rotation of the flange 1a relative to the hub causes the upper surfaces of the catches 4' to be forcibly hooked on the lower surfaces of the cross-piece step portions 6. Thus the flange 1a and the hub 2 are brought into engagement in the circumferential direction.

In addition to the basic structures for engagement described above, there have appeared improved structures which incorporate step portions of two-level design directed to precluding possible breakage of engagement due to unexpected reverse rotation of the flange relative to the hub. For example, the projections 3 each are given a greater thickness on the side nearest to the position at which the rotation of the hub relative to the flange 1a is started and a smaller thickness on the side farthest from the position mentioned above, so that after the catches 4 have ridden over the thicker portions of the projections and snapped into fast engagement with the thinner portions, they are prevented from making a reverse rotation and loosening themselves from the projections. Otherwise, the catches 4 which are extended in the circumferential direction have their forward ends folded back upwardly so that they seize hold of the cross-piece step portions 6 in consequence of a similar snapping engagement.

For the present invention, such structures as are aimed at rotational assemblage of the tape reel are left to be freely selected. The fundamental idea of the present invention resides in providing a tape reel which avoids impairing the great convenience enjoyed in the assemblage of the tape reel owing to the rotational-assemblage structure mentioned above and utilizes to advantage novel devices capable of obtaining fast retention of the inner end of the tape in consequence of the rotation of the flange 1a relative to the hub 2 at the time that the tape reel is assembled.

To be specific, the outer circumferential edge of the hub has a notch formed in the axial direction at one portion thereof to provide a radial groove 7 piercing radially through the circumferential edge into the hub interior. The axial width of this groove 7 is equal to or slightly greater than the width at the inner end $T_a$ of the tape "T" to be wound on the reel in order for the inner end $T_a$ of the tape "T" to be inserted into the hub interior from the outer periphery of the hub 2.

Figure 2:
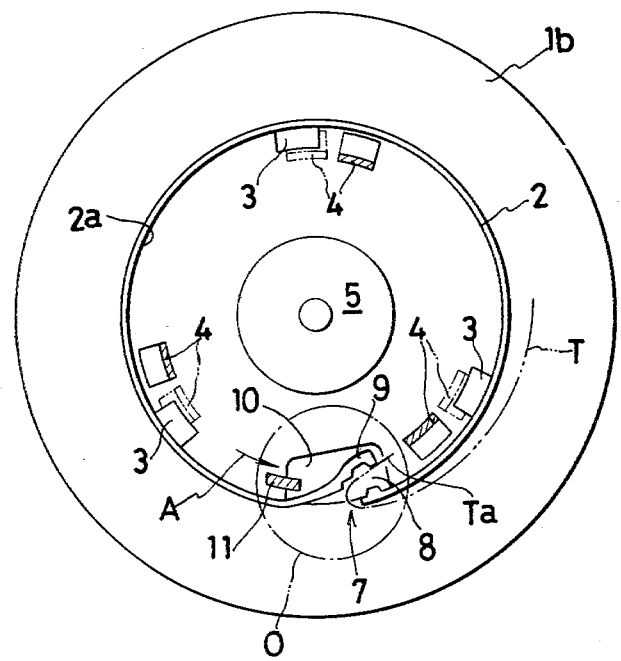
FIG. 2 is a plan view of the interior of the hub in the tape reel of FIG. 1.
Figure 3:
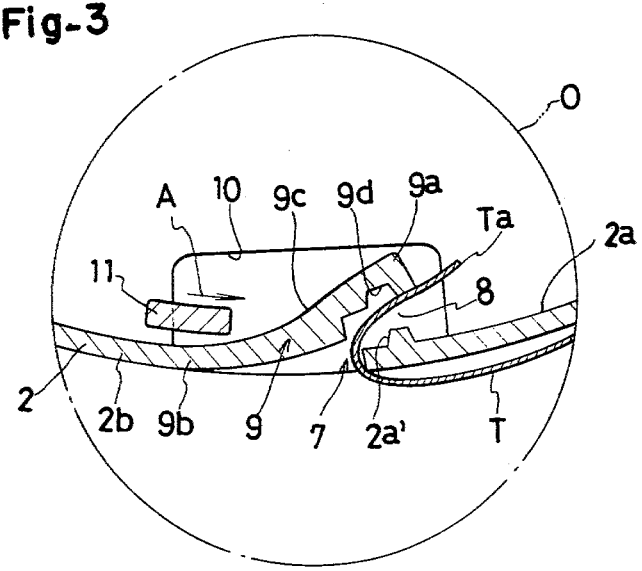
FIG. 3 is an enlarged sectional view of the essential part of the tape reel of FIG. 1, as held in a state having the inner end of the tape inserted in the reel.

In FIG. 2, the device of the present invention for fast retention of the inner end of the tape is encircled with a chain line. Enlarged views of this device are illustrated in FIGS. 3 and 4.

The device incorporates resilient wall means 9 defining a space 8 which extends in a substantially circumferential direction and establishes communication between the opening of the groove 7 directed toward the center of the hub and the inner wall 2a of the hub.

In this particular embodiment, since the resilient wall means is in the shape of a small extended portion, it will be hereinafter called "a resilient piece". This resilient piece 9 is opposed across the space 8 to the inner wall surface 2a of the hub on one side of the radial groove 7 and is terminated in a free end 9a. The other end 9b of the resilient piece 9 is integrally joined to one portion of the hub reel proper (the preformed union between the reel 1b and the hub 2) in such a manner that, upon exertion thereon of an external force, the resilient piece 9 is allowed to change its position with the aforementioned other end as the fulcrum in the direction of narrowing the space 8 in the radial direction and eventually eliminating the space completely. In this case, the joined end 9b of the resilient piece integrally continues into the portion 2b of the hub on the other side of the radial groove 7. The resilient piece, in the direction parting from the joined end 9b and approaching the radial groove 7, is bent inwardly with an increasingly greater curvature than the curvature of the circle defining the hub of a desired diameter and, after giving rise to the space 8 beyond the radial groove 7, is terminated in the aforementioned free end 9a. To permit the molding of the resilient piece in the shape described above, a perforation 10 is formed in the bottom plate of the flange 1b integral with the hub 2 at a position corresponding to the position to be occupied by the resilient piece. This is strictly a matter of interest in design.

The radially inner wall surface 9c of the resilient piece 9 begins to curve slightly inwardly at the joined end 9b, whereas the radially outer wall surface 9d possesses a contour complementing the inner wall portion 2a' of the hub to which the outer wall surface is opposed across the space 8. To be specific, the outer wall surface 9d possesses a contour stepped in the circumferential direction as shown in FIG. 4.

The inner end $T_a$ of the tape "T" is brought from the outer circumferential side of the hub, inserted through the radial groove 7 and passed through the circumferential opening 8 communicating to the hub interior. This insertion of the inner end of the tape is carried out before the separately molded flange 1a is joined to the hub. It is now assumed that the tape reel is designed so that the assemblage thereof is effected by the conventional method, i.e. by rotating the hub in the direction "A" as indicated in FIGS. 2 and 3. To permit this assemblage, the separately molded flange 1a is provided with a protuberance 11 (in the shape of a plate hung down from the flange surface as illustrated) at a position such that, when the flange 1a is applied to the open end surface of the hub, the protuberance 11 circumferentially falls to the rear of the radially inner wall surface 9c of the resilient piece 9.

When the separately molded flange 1a as held in its original position is rotated relative to the hub in a manner described above with reference to FIGS. 1 and 2, the protuberance 11 advances while sideswiping the inner wall surface 9c of the resilient piece 9. Because of the pressure applied outwardly by this protuberance, the resilient piece 9 is gradually bent at the joined end 9b thereof serving as the fulcrum in the direction of narrowing the space 8 in which the inner end of the tape has been loosely inserted. As the protuberance 11 completes its slide on the inwardly curved surface 9c, the space 8 completely disappears and the inner end of the tape is firmly caught between the outer wall surface 9d of the resilient piece and the inner wall surface 2a' of the hub (FIG. 4).

By the time the fastening of the tape end is finished, the attachment of the flange 1a to the hub 2 is also brought to completion. Thus, the tape reel of the present invention permits the assemblage thereof to be effected with unusually high efficiency because the fast retention of the inner end of the tape is accomplished at the same time that the separately molded flange 1a is simply rotated relative to the hub in so far as the tape end is inserted in the groove before the upper end of the hub is covered by the attachment thereto of the flange 1a. Better still, in the absence of interference otherwise possibly offered by the flange 1a, the loose insertion of the inner end $T_a$ of the tape into the groove 7 prior to the reel assemblage can be accomplished simply by allowing the tape end to fall spontaneously into the groove from above.

As described above, the tape reel of the present invention enables the two steps of work, i.e. the work for the attachment of the separately molded flange to the hub and the work for the fastening of the tape end to the hub which have been inevitably involved in the conventional tape reel assemblage, to be accomplished in one step. Moreover, the one-step work itself is so simple as to give an impression that the work for the fast retention of the tape end to the hub were no longer required.

The position of the engaging protuberance 11 relative to the resilient piece 9 is to be fixed, as a matter of course, in due consideration of the angle involved in the rotation of the flange at the time of the tape reel assemblage. In the case of the illustrated embodiment described so far, the space 8 which disappears when the engaging proturberance 11 is pressed in the radial direction into tight contact with the resilient piece 9 across the tape end is allowed to retain the inner end of the tape with the force augmented by the frictional force produced by the sharp corners of the outer surface 9d of the resilient piece and the inner surface 2a of the hub. When the pressure produced between the surfaces 9d, 2a' is sufficient for fast retention of the tape end, these surfaces need not be zigzagged as illustrated but may be flat.

Further in the present embodiment, the resilient piece is shaped with a curvature such that the outer surface of the resilient piece 9 near the joined end 9b thereof constitutes itself a part of the outer wall surface of the hub 2 when the fast retention of the tape end to the hub is brought to completion.

In the embodiment described above, the engaging protuberance 11 fulfills the function of causing the resilient piece 9, by virtue of the latter's specifically fixed wall thickness, to narrow indirectly the substantially circumferential space by pressing the tape end thereagainst until the space ceases to exist. Another embodiment wherein the engaging protuberance and the resilient piece both participate directly in the work of eliminating the space and, at the same time, seizing hold of the inner end of the tape is illustrated in FIGS. 5 and 6.

In the following description of this embodiment, identical or like components are designated by like symbols and the description is limited to the similarly encircled important part of the tape reel.

Again in this embodiment, a groove 7 of sufficient length for free passage therethrough of the tape "T" is formed in the radial direction in one portion of the outer circumferential edge of the hub 2 and a resilient piece 9 is disposed to define the substantially circumferential space 8 serving to establish communication between the groove and the opening into the hub interior. In this case, however, the resilient piece 9 is not continued into the outer circumferential edge of the hub but is raised inwardly in the radial direction from the inner wall surface 2a of the hub on one side of the groove 7 and then bent substantially at a right angle and extended past the groove 7 and terminated in a free end 9a. A perforation 10 or other similar means to be used for the molding of this resilient piece may be optionally incorporated. The distance between the outer wall surface 9d of the resilient piece near the free end thereof and the inner wall surface 2a' of the hub to which the wall surface 9d is opposed, namely the width in the radial direction of the substantially circumferential space 8, is at least required to be slightly smaller than the total of the thickness of the engaging protuberance 11 and that of the inner end $T_a$ of the tape.

Observance of this specific distance is essential because in the present embodiment, the engaging protuberance 11 which rotates in the direction of the arrow "A" in conjunction with the flange 1a in the course of the tape reel assemblage comes into contact, though indirectly across the inner end $T_a$ of the tape, with the resilient piece 9. In other words, it is so designed that it eliminates the space 8 by directly entering the space 8.

Now, the function of this engaging protuberance 11 will be described. After the inner end $T_a$ of the tape has been inserted through the radial groove 7 as far as the substantially circumferential space 8 as illustrated in FIG. 5, the flange 1a is applied to and rotated relative to the hub 2 (not shown). During the rotation of the flange 1a, the engaging protuberance 11 forces its way into the space 8, then comes into contact, though indirectly across the tape end, with the resilient piece 9, directly fills the space 8 gradually and comes eventually to pinch the inner end 9a of the tape through cooperation with the resilient piece (FIG. 6).

Of course, the arrangement for the tape reel assemblage due to the rotation of the flange 1a is the same as that used for the first embodiment which comprises the step portions 3 and the catches 4.

Incidentally in the embodiment under discussion, since the outer wall surface of the hub does not directly constitute itself a portion of the resilient piece 9, it may be replaced by a stationary wall. The stationary wall must, however, be made of a material capable of providing a slight degree of resilience (capacity for deformation under impacts) since if it has absolutely no resilience, then the finished tape reel has a possibility of sustaining unexpected breakage in the inner end of the tape under excessive impacts.

Although the embodiments cited above have been described as applied to reels for the video cassette tapes, the tape reels according to the present invention can be applied similarly effectively to audio tapes.

As described in detail above, the tape reel of the present invention permits the fast retention of the tape end to be effectively and rationally accomplished simultaneously with the work for the reel assemblage and, consequently, contributes immensely to the improvement of work efficiency and the reduction of cost as well.

What is claimed is:

1. In a tape reel of the rotational assemblage type including two flanges, and a generally hollow hub supporting said flanges in spaced relation, at least one of said two flanges being formed separately from said hub, said at least one flange and said hub each having cooperative engaging means such that assembly of said at least one flange to one end of said reel hub and rotation of said at least one flange relative to said hub establishes tight engagement between the cooperative engaging means, a generally radially disposed slot communicating between the external circumferential surface of said reel hub and its interior, said slot adapted to permit insertion of the inner end of the tape to be wound on the hub, at least one resilient wall blocking radial access to the interior of said hub through said slot and forming a tortuous circumferentially disposed path to the interior of said hub, protuberance means depending from said at least one flange such that as a consequence of the rotational assembly of the flange relative to the hub said protuberance means in cooperation with said at least one resilient wall closes up said circumferentially disposed path and captures said inner end of the tape inserted therein.

2. The tape reel according to claim 1 wherein the engaging protuberance means comes into direct contact with the radial inner surfaces of said at least one wall and pushes said at least one resilient wall outwardly in the radial direction and closes said circumferential path.

3. The tape reel according to claim 1, wherein the engaging protuberance means moves into said circumferentially disposed path and forces said inner tape end directly against said resilient wall.

4. A tape reel according to claim 2, wherein said at least one resilient wall is generally a resilient cantilever arm having primary means at its free end that cooperate with fixed means to form a tortuous path gripping means.

* * * * *